United States Patent
Haimoff

(10) Patent No.: US 8,021,589 B2
(45) Date of Patent: Sep. 20, 2011

(54) MOLDED ARTICLE WITH METAL REINFORCING AND METHOD FOR ITS MANUFACTURE

(75) Inventor: Efraim Haimoff, Mevasereth Zion (IL)

(73) Assignee: Keter Plastic Ltd., Herzelyia (IL)

( * ) Notice: Subject to any disclaimer, the term of this patent is extended or adjusted under 35 U.S.C. 154(b) by 1292 days.

(21) Appl. No.: 10/579,678

(22) PCT Filed: Dec. 1, 2004

(86) PCT No.: PCT/IL2004/001096
§ 371 (c)(1),
(2), (4) Date: May 18, 2006

(87) PCT Pub. No.: WO2005/054740
PCT Pub. Date: Jun. 16, 2005

(65) Prior Publication Data
US 2007/0071929 A1    Mar. 29, 2007

Related U.S. Application Data

(60) Provisional application No. 60/526,266, filed on Dec. 3, 2003.

(51) Int. Cl.
*B29C 45/14* (2006.01)
(52) U.S. Cl. .................................................. 264/279
(58) Field of Classification Search .................. 264/275, 264/274, 334, 279
See application file for complete search history.

(56) References Cited

U.S. PATENT DOCUMENTS

| 4,053,126 A | * | 10/1977 | Duret et al. | .................... 244/119 |
| 5,160,772 A |   | 11/1992 | Futami et al. | |
| 5,846,463 A |   | 12/1998 | Keeney et al. | |

FOREIGN PATENT DOCUMENTS

| DE | 200 13 208 U1 | 10/2000 |
| FR | 2 265 527 | 10/1975 |
| GB | 2 370 803 A | 7/2002 |
| GB | 2 378 915 A | 2/2003 |
| JP | 63-141713 | 6/1988 |
| JP | 03-036008 A | 2/1991 |

* cited by examiner

*Primary Examiner* — Christina Johnson
*Assistant Examiner* — Larry Thrower
(74) *Attorney, Agent, or Firm* — The Nath Law Group; Susanne M. Hopkins; William L. Klima

(57) ABSTRACT

A composite article (10) comprises a channel-shaped metal reinforcing element (12) and molded plastic shell (14) including a portion formed as a wall (18) mechanically closing the open side of the channel shape. The reinforcing element may include a plurality of open channels (46) each of them being closed by a portion of the plastic coating. Constructive elements (50) comprising at least two such composite articles may be manufactured, for example a flat panel made of parallel elongated beams. A method for manufacturing the composite article in an assembly mold (70) includes inserting a mold core (20) in the metal reinforcing element (12) via the open side of the channel transversely to the channel axis, assembling all parts of the mold, molding of the plastic coating (14), disassembling the mold; and removing the mold core from the composite article in direction parallel to the channel axis.

15 Claims, 5 Drawing Sheets

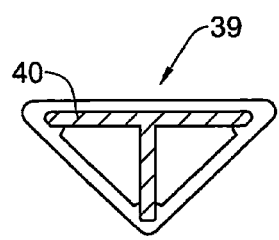
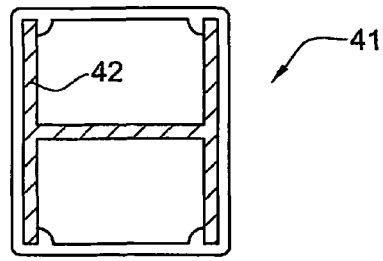
FIG. 5A          FIG. 5B
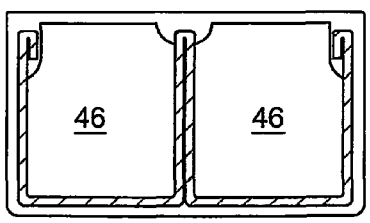
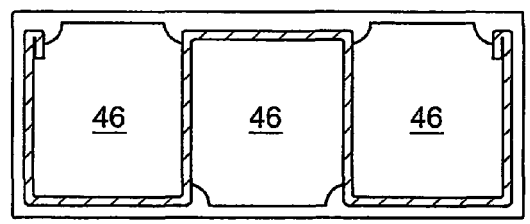
FIG. 6A          FIG. 6B
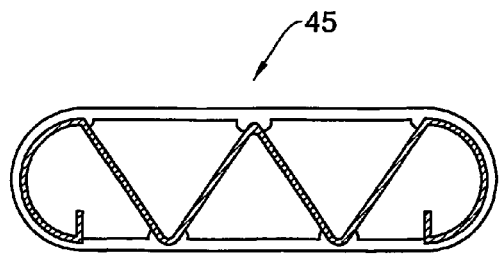
FIG. 6C

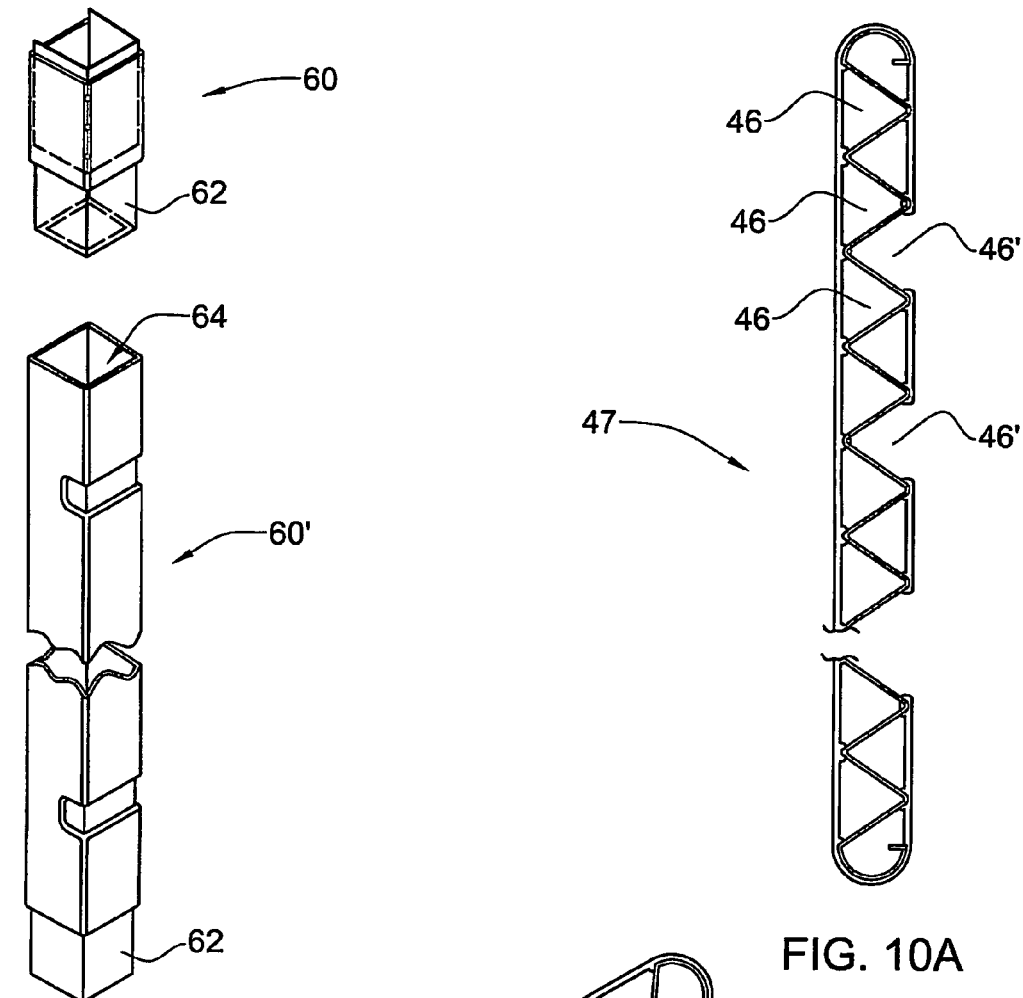
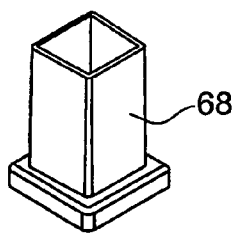
FIG. 9
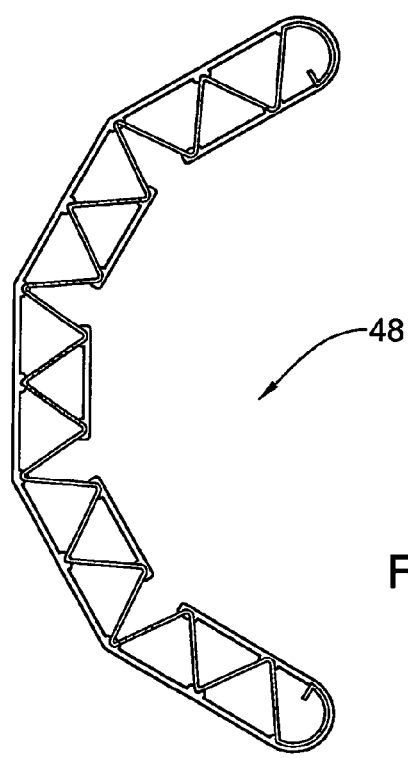
FIG. 10A
FIG. 10B

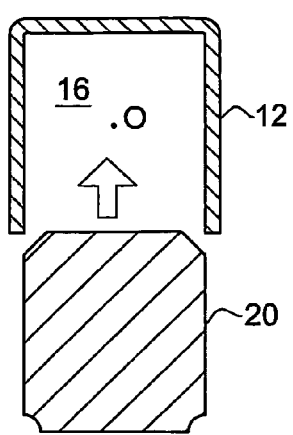
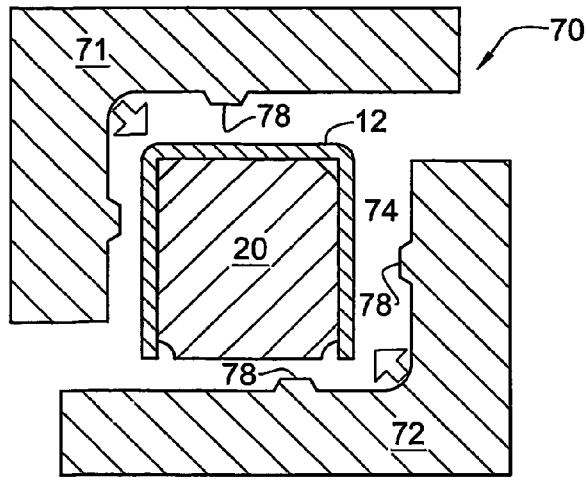
FIG. 11A  FIG. 11B
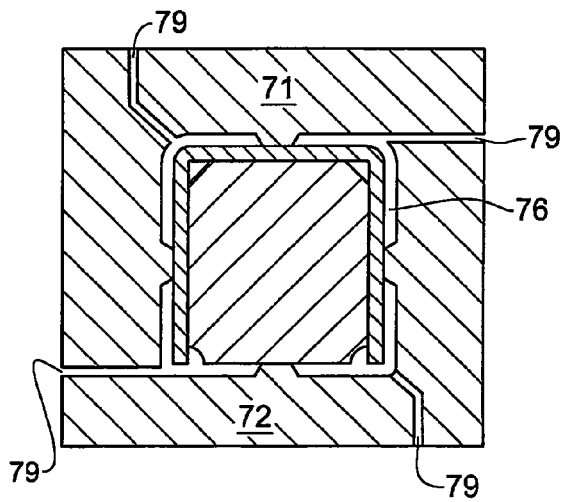
FIG. 11C
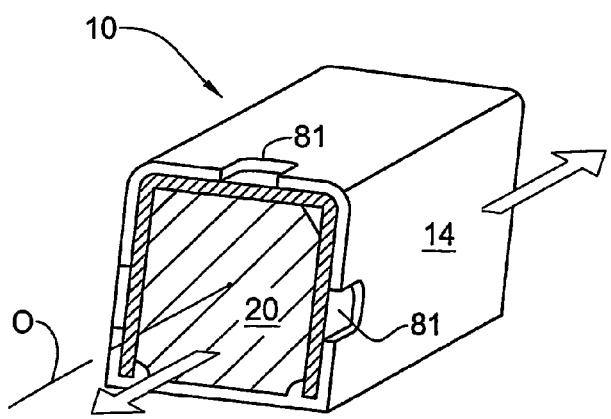
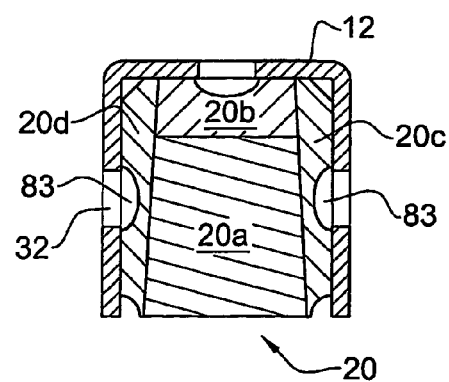
FIG. 11D  FIG. 12

MOLDED ARTICLE WITH METAL REINFORCING AND METHOD FOR ITS MANUFACTURE

CROSS-REFERENCE

This is a National Phase Application filed under 35 U.S.C. 371 of International Application No. PCT/IL2004/001096, filed on Dec. 1, 2004, claiming the benefit under 35 USC 119(e) of U.S. Provisional Patent Application No. 60/526,266, filed on Dec. 3, 2003, the entire content of each of which is hereby incorporated by reference in its entirety.

FIELD OF THE INVENTION

This invention relates to composite articles made of molded plastic, more particularly to articles with metal reinforcing and methods of producing the same.

BACKGROUND OF THE INVENTION

Composite articles are manufactured by injection molding of synthetic resins over an insert made of another material, most often metal, and disposed in the mold. These articles combine useful properties of the constituent materials, for example strength of a metallic reinforcing member with insulation or pliability of a plastic coating.

U.S. Pat. No. 5,160,772 describes integrally molded lightweight composite articles having a foam core, a metallic supporting element encapsulated in the foam core, and a rigid outer layer (shell) of polymer around the core. The articles are formed by placing a foam core having an integral outer skin in a mold and polymerizing a monomer around the core.

JP03036008 discloses a composite article and a molding method where two metallic plates are arranged with a space between them in a mold. The space is then filled with synthetic resin to form a core layer. The metallic plates have openings and the mold has corresponding hollows which are also filled, so that protrusions may be formed integral with the core layer.

SUMMARY OF THE INVENTION

According to the present invention, there is provided a composite article comprising a metal reinforcing element and molded plastic coating firmly attached thereto. The reinforcing element is formed as an open channel having a longitudinal axis and an open side parallel to the axis. The plastic coating includes a portion formed as a wall mechanically closing the open side of the channel.

The form of the open channel preferably allows insertion of a mold core snugly fitting the reinforcing element, through the open side of the channel, in the absence of the plastic coating. This manner of insertion provides great advantages in production, as shown below.

The reinforcing element may have various forms including at least one channel: two side walls and a transverse wall connecting them, a profile shaped as a truncated oval, two walls connected along a common edge, etc. The reinforcing element may comprise a plurality of open channels each of them being mechanically closed by a portion of the plastic coating. Alternatively, one or more channels of the reinforcing element may be left opened, thereby allowing plastic deformation of the article in the place of assembly. For example, a flat panel made according to the present invention, having three open channels, may be bent into a rectangular column.

The metal reinforcing element preferably has openings providing better adhesion with the plastic coating. The openings may be through-going and the plastic coating may have protrusions with swollen heads at the inner side of the channel, obtained through said openings.

The metal reinforcing element may be made of one of the following: bent sheet metal, extruded metal profile, rolled metal profile.

The plastic coating preferably has closed tubular form embracing the metal reinforcing element. However, the plastic coating may include a second channel with open profile having two free edges fixed to two respective edges of the open channel of the metal reinforcing element.

The plastic coating may have a portion partially or fully covering the metal reinforcing element at the inner side of the channel. The plastic coating may also have openings in the closing wall or/and openings located so as to expose a portion of the metal reinforcing element.

absence of the plastic coating. This manner of insertion provides great advantages in production, as shown below.

The reinforcing element may have various forms including at least one channel: two side walls and a transverse wall connecting them, a profile shaped as a truncated oval, two walls connected along a common edge, etc. The reinforcing element may comprise a plurality of open channels each of them being mechanically closed by a portion of the plastic coating. Alternatively, one or more channels of the reinforcing element may be left opened, thereby allowing plastic deformation of the article in the place of assembly. For example, a flat panel made according to the present invention, having three open channels, may be bent into a rectangular column.

The metal reinforcing element preferably has openings providing better adhesion with the plastic coating. The openings may be through-going and the plastic coating may have protrusions with swollen heads at the inner side of the channel, obtained through said openings.

The metal reinforcing element may be made of one of the following: bent sheet metal, extruded metal profile, rolled metal profile.

The plastic coating preferably has closed tubular form embracing the metal reinforcing element. However, the plastic coating may include a second channel with open profile having two free edges fixed to two respective edges of the open channel of the metal reinforcing element.

The plastic coating may have a portion partially or fully covering the metal reinforcing element at the inner side of the channel. The plastic coating may also have openings in the closing wall or/and openings located so as to expose a portion of the metal reinforcing element.

The plastic coating may be made of the following materials: thermoplastics, polymerizing resin, polypropylene, polyacetal, polystyrene, with or without filling additives like fibers or chalk or other flowable and settable materials that may be injection-molded, cast, or low-pressure molded.

injecting flowable and settable plastic coating into the space to form the composite article;
   releasing the obtained article including the reinforcing element, the set plastic coating and the mold core, by disassembling the mold; and
   removing the mold core from the composite article in direction along the channel axis.

Preferably, the assembling of the mold parts and the metal reinforcing element is done by relative motion thereof transverse to the channel axis.

The mold parts preferably have a plurality of protrusions adapted to abut the metal reinforcing element when the mold is assembled, thereby fixing the reinforcing element in the mold cavity. The protrusions may be relatively wide and may have rounded edges so as to form in the plastic coating decorative windows visibly exposing the surface of the metal reinforcing element.

When the reinforcing element has through openings for better adhesion to the plastic coating, the mold core may have recesses located opposite the openings when the mold core is inserted in the reinforcing element, so that the injected plastic coating can form protrusions with swollen heads at the inner side of the channel.

The mold core may be assembled from two or more parts divided along the channel so as to facilitate the removing of the core in direction parallel to the channel axis.

The composite article of the present invention presents numerous advantages in production, functionality and maintenance:
- strength and stability at extremely low weight due to the thin metal profiles, the thin plastic coating and the closed tubular form of the article;
- possibility to employ open metal profiles such as bent, rolled and extruded profiles which are readily available and cheap in production;
- usage of the well known and developed technologies such as injection-molding and casting;
- fast and efficient mold assembly;
- possibility to employ various types of plastics such as thermosetting and thermocondensing resins, as mentioned above, with good adhesion to metal;
- possibility to obtain a variety of composite profiles;
- possibility to design various constructive modules based on the composite article;
- possibility to achieve various decorative effects by exposing parts of the reinforcing element.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIGS. 5A and 5B show composite articles of the present invention with multiple channels and rolled or extruded reinforcing elements.

FIGS. 6A, 6B and 6C show composite articles of the present invention with multiple channels and bent or extruded reinforcing elements.

FIG. 9 is a perspective view of a modular support based on the composite article of the present invention.

FIGS. 10A and 10B are sectional views of a multi-channel composite article according to the present invention, before and after bending;

FIGS. 11A, B, C and D illustrate the process of production of the composite article according to the method of the present invention; and FIG. 12 shows a mold core composed of four parts for production of the composite article.

DETAILED DESCRIPTION OF THE INVENTION

Figure 1:
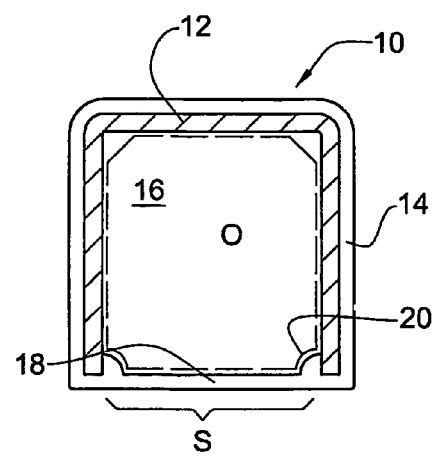
FIG. 1 is a cross-sectional view of the basic composite article of the present invention.

With reference to FIG. 1, there is shown the cross-section of a composite article 10 of the present invention. The article includes a metal reinforcing profile 12 and injection-molded plastic coating 14 firmly attached to the metal in the process of injection molding. The reinforcing profile 14 has the form of an open channel 16 having a longitudinal axis O and an open side S parallel to the axis. The plastic coating 14 includes a portion formed as a wall 18 mechanically closing the open side S of the channel. The form of the open channel 16 allows insertion of a rigid mold core 20 snugly fitting the reinforcing profile 12, through the open side S before the injection-molding (see also FIG. 11A). Insertion transverse to the channel axis provides great advantages in production, as shown below. The core 20 need not fill the whole internal space of the channel 16 or fit tightly along the whole internal surface thereof. The snug fit means that the core 20 provides mechanical stability to the walls of the reinforcing profile 12 against the pressure during injection molding and prevents leakage of the liquid plastic towards the internal surface of the profile 12.

Figure 2A:
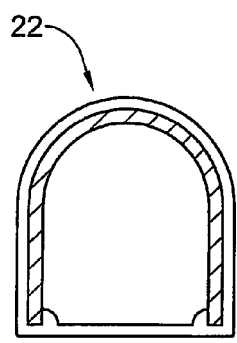
FIGS. 2A, 2B and 2C show three variations of the cross section of the basic composite article.
Figure 2B:
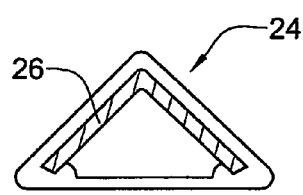
Figure 2C:
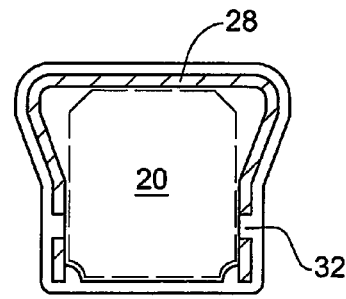

The composite article of the present invention may provide a variety of forms including various reinforcing profiles. FIGS. 2A, 2B and 2C show variations of the basic form in FIG. 1, such as truncated oval 22 (C-shape), triangle 24 based on L-profile 26, and a profile with swollen head 28. FIG. 2C shows that the mold core 20 may support the reinforcing profile only in separate places along the circumference. The profile 28 has through-going holes 32 receiving the injected plastic for better adhesion or interlocking. The plastic material may be formed with heads 30 at the inner side of the reinforcing profile (see FIG. 4).

Figure 3:
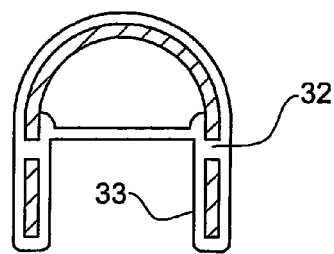
FIG. 3 shows a composite article of the present invention with partially coated internal surface of the reinforcing element.
Figure 4:
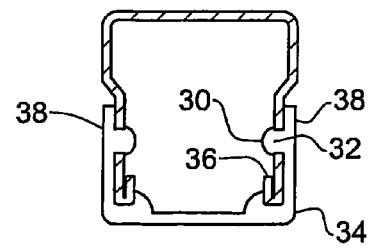
FIG. 4 shows a composite article of the present invention with non-closed plastic coating.

The inner surface of the reinforcing profile may be partially covered with plastic coating 33 as shown in FIG. 3. Alternatively, the plastic coating may not form a closed tube but an open channel, as shown in FIG. 4, where the free edges 36 of the reinforcement profile 12 and the free edges 38 of the plastic coating 34 are firmly fixed to each other to close the profile of the composite article.

The composite article of the present invention may comprise more than one closed channel. For example, FIG. 5A shows article 39 with triangular section molded over a T-profile 40 having two channels. FIG. 5B shows an article 41 with rectangular section molded over an H-profile 42, also having two channels.

FIGS. 6A, 6B and 6C show more examples of composite articles 43, 44 and 45, comprising reinforcing elements with a plurality of open channels 46. Each open channel of the reinforcing element is mechanically closed by a portion of the plastic coating. Alternatively, if one or more channels of the reinforcing element are left opened, then the article may be bent after molding, by plastic deformation of the metallic reinforcing element. In an example shown in FIGS. 10A and 10B, a flat panel 47 is made with multiple channels 46, some of them being left open (channels 46'). The panel 47 may be bent into a polygonal profile 48 in the place of assembly, as shown in FIG. 10B. If more channels on one side of the panel are left open, then the panel may be rolled into a round column, etc.

The metal reinforcing profile may be made of bent sheet metal, extruded metal profile or rolled metal profile. It would be appreciated that profiles in FIG. 5 can be made of rolled metal, while profiles in FIGS. 4 and 6 would be more conveniently made of bent metal sheet. The latter is especially advantageous since the reinforcing profile may be made of quite thin sheet, for example 0.5 mm steel. Such sheet may be easily bent, punched or pressed, yet it provides remarkable structural strength for the applications (shelves and supports) shown below, due to the closed form of the profile which is obtained by the closing plastic wall.

The plastic coating is also relatively thin, about 2-3 mm. It may also have openings in the closing wall or/and openings located so as to expose a portion of the metal reinforcing profile. It may be made of thermoplasts or polymerizing resins, such as polypropylene, polyacetal, polystyrene, with or without filling additives like fibers or chalk or other flowable and settable materials that may be injection-molded, cast, or low-pressure molded.

Figure 7:
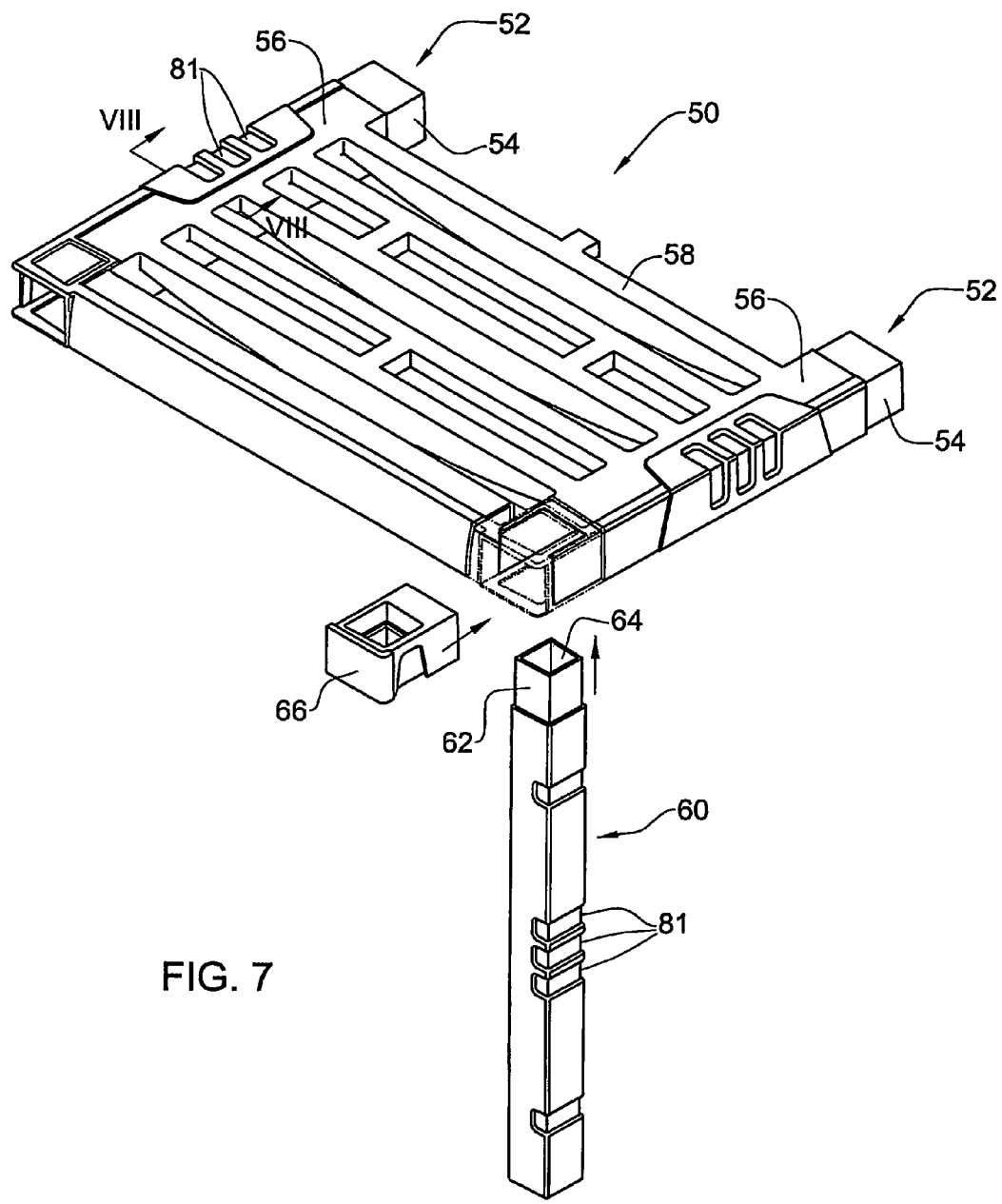
FIG. 7 shows perspective view of a shelf-and-pillar assembly based on the composite article of the present invention.

The composite articles of the present invention can be suitably incorporated in various constructive elements and products. With reference to FIG. 7 and the close-up view in FIG. 8, there is provided a flat constructive element (shelf) 50 comprising two parallel carrying elongated beams 52 which constitute composite articles as described above, having reinforcing profiles 54 and molded plastic coating 56. The beams 52 are connected by transverse beams 58 formed integrally from the same molded plastic as the beams 52. It would be appreciated that, in order to manufacture the shelf 50 by single molding operation, it is preferable to design the transverse beams 58 as open profiles with an open side oriented towards one side of the shelf to dispose the metal reinforcing profiles 54 with their open side in the same direction.

With reference to FIG. 9, there is shown another constructive element, a modular support 60 constituting a composite article as described above. The modular support 60 has an extension 62 of the molded plastic coating at one end. The external shape of the extension 62 allows tight insertion into the channel 64 of a similar support 60', in the direction of the channel axis. Thus, a number of shelves 50 can be assembled with multiple modular supports 60 to form a rigid, stable and light-weight storage rack, as shown in FIG. 7.

With reference to FIGS. 11A, B, C and D, there is shown a method for manufacturing the above-described composite article by injection-molding. According to the method, the mold core 20 is inserted in the prepared metal reinforcing profile 12, so that the mold core snugly fits the channel 16. The insertion is done through the open side of the channel, transversely to the channel axis.

The metal reinforcing profile 12 with the inserted core 20 is assembled with an injection mold 70. The injection mold comprises two parts 71 and 72 formed to define a mold cavity 74 when the mold 70 is assembled. The mold 70 is designed to accommodate the metal reinforcing profile 12, allowing space 76 for the plastic coating. The reinforcing element 12 is fixed in the cavity of the mold by means of protrusions 78 abutting the metal reinforcing profile and the mold core 20.

Next, flowable plastic composition is injected through channels 79 into the space 76 to form the composite article and is then subjected to curing, cooling, etc. by a process known per se in the art of injection molding and casting.

The mold 70 is disassembled and the obtained article 10 is released. At this stage, the article 10 includes the reinforcing profile 12, the set plastic coating 14, and the mold core 20.

Last, the rigid core 20 is removed from the composite article 10 in direction along the channel axis.

Figure 8:
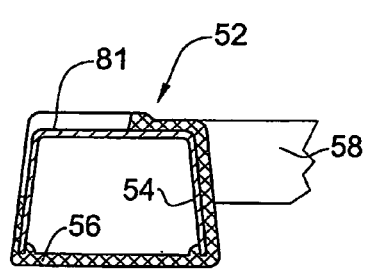
FIG. 8 is a close-up view of a section through a beam of the shelf of FIG. 7.

The fixing protrusions 78 may be relatively wide, so as to form in the plastic coating decorative windows 81 visibly exposing the surface of the metal reinforcing profile (see also FIG. 8).

With reference to FIG. 12, the mold core 20 may have recesses 83 located opposite the openings 32 in the reinforcing profile 12, so that the injected plastic coating can form protrusions with swollen heads at the inner side of the channel. In such case, the mold core 20 may be assembled from two or more parts 20a, 20b, etc., divided along the channel axis so as to facilitate the removal of the core 20 in direction parallel to the channel axis.

It will be appreciated that the above method of production of the composite article allows combining the strength and stability of shell structures based on closed profiles geometry, the availability and cheapness of the thin metal open profiles, and versatility, durability and decorative properties of injection-molded plastics. Especially advantageous is the fast and efficient mold and core assembly and mold disassembly in direction perpendicular to the article axis which allows very fast production cycles.

The composite structure of the article allows designs without bulky volumes of plastic material and thus avoiding sink marks which characteristically appear at the base of structural ribs in all-plastic articles after setting.

Although a description of specific embodiments has been presented, it is contemplated that various changes could be made without deviating from the scope of the present invention. Other configurations of the reinforcing profile and the composite article may be readily derived from FIGS. 2 to 10. For example, a multi-channel composite profile may have non-closed channels at both sides, allowing elastic and/or plastic deformation and obtaining various cross-sections after the molding; a molded product may include non-co-planar composite articles of the invention, etc.

The invention claimed is:

1. Manufacturing a composite article comprising a metal reinforcing element and molded plastic coating firmly attached thereto, wherein the reinforcing element is formed to define an open channel having a longitudinal axis and an open side parallel to the axis, and the plastic coating includes a portion formed as a wall mechanically closing the open side of the channel, where the form of the metal reinforcing element allows insertion, via the open side of the channel, of a mold core which is configured to provide mechanical stability to the reinforcing element, the manufacturing comprising:
   providing the metal reinforcing element;
   providing the mold core;
   providing a mold comprising at least two parts formed to define a mold cavity therebetween when the mold is assembled, the mold being adapted to accommodate the metal reinforcing element fixedly in the mold cavity, allowing space for the plastic coating;
   inserting the mold core in the metal reinforcing element via the open side, so that the mold core provides mechanical support to the element;
   assembling the mold parts and the metal reinforcing element with the inserted core therein so as to fix the reinforcing element in the mold cavity;
   injecting flowable and settable plastic coating into the space to form the composite article;
   releasing the obtained article including the reinforcing element, the set plastic coating and the mold core, by disassembling the mold; and
   removing the entire mold core from the article in a direction along the channel axis.

2. The manufacturing of the composite article according to claim 1, wherein the assembling of the mold parts and the metal reinforcing element is done by relative motion thereof transverse to the channel axis.

3. The manufacturing of the composite article according to claim 1, wherein the mold parts have a plurality of protrusions adapted to abut the metal reinforcing element when the mold is assembled, thereby fixing the reinforcing element in the mold cavity.

4. The manufacturing of the composite article according to claim 3, wherein at least part of the protrusions have rounded edges so as to form in the plastic coating decorative windows visibly exposing the surface of the metal reinforcing element.

5. The manufacturing of the composite article according to claim 1, wherein the reinforcing element has openings and the injected plastic coating fills them.

6. The manufacturing of the composite article according to claim 5, wherein the mold core has recesses which are located opposite the openings when the mold core is inserted in the reinforcing element, so that the injected plastic coating can form protrusions obtained through the openings, the protrusions having swollen heads at the inner side of the channel.

7. The manufacturing of the composite article according to claim 1, wherein the mold core is assembled from at least two parts divided along the channel so as to facilitate the removing of the core in a direction parallel to the channel axis.

8. The manufacturing of the composite article according to claim 1, wherein the plastic coating is 2-3 mm thick.

9. The manufacturing of the composite article according to claim 1, wherein the final step includes completely removing the entire mold core from the article.

10. The manufacturing of the composite according to claim 1, wherein the mold core is slidingly removed.

11. The manufacturing of the composite according to claim 1, wherein, during removal of said mold core from the article, said plastic coating remains substantially undamaged.

12. The manufacturing of the composite article according to claim 1, wherein removal of said mold core from the article does not impact any substantially damage to the coating.

13. The manufacturing of the composite article according to claim 1, wherein, in cross-section of the composite article taken perpendicular to the longitudinal axis, said coating forms a closed contour encompassing the reinforcing element.

14. The manufacturing of the composite article according to claim 13, wherein, during removal of said mold core from the article, said contour remains closed.

15. The manufacturing of the composite article according to claim 13, wherein, during injection, said mold core prevents the settable plastic from filling said channel.

* * * * *